(12) United States Patent
Pigott et al.

(10) Patent No.: US 10,474,938 B2
(45) Date of Patent: Nov. 12, 2019

(54) INVENTORY MANAGEMENT SYSTEM (71) Applicant: FLOCKSTOCK PTY LTD, North Fremantle, WA (AU)

(72) Inventors: Diarmuid Pigott, Nedlands (AU); Richard Poulson, North Fremantle (AU); Steve Poulson, East Fremantle (AU)

(73) Assignee: FLOCKSTOCK PTY LTD, North Fremantle, WA (AU)

( * ) Notice: Subject to any disclaimer, the term of this patent is extended or adjusted under 35 U.S.C. 154(b) by 0 days.

(21) Appl. No.: 15/952,818

(22) Filed: Apr. 13, 2018

(65) Prior Publication Data
US 2018/0307959 A1 Oct. 25, 2018

(51) Int. Cl.
G06K 7/08 (2006.01)
G06K 19/07 (2006.01)
G06Q 10/08 (2012.01)
G06K 7/10 (2006.01)

(52) U.S. Cl.
CPC ..... G06K 19/0712 (2013.01); G06K 7/10019 (2013.01); G06K 7/10366 (2013.01); G06K 19/0702 (2013.01); G06K 19/0723 (2013.01); G06Q 10/087 (2013.01)

(58) Field of Classification Search
USPC .......................................................... 235/451
See application file for complete search history.

(56) References Cited

U.S. PATENT DOCUMENTS 7,156,312 B2 * 1/2007 Becker ................ G06K 7/0008
235/451
7,370,027 B2 5/2008 Sakurazawa et al.
2007/0046467 A1 3/2007 Chakraborty et al.
2008/0024274 A1 1/2008 Ishida et al.
2010/0010868 A1 1/2010 Aimone Catti

FOREIGN PATENT DOCUMENTS

| CN | 1776719 A | 5/2006 |
|---|---|---|
| CN | 203025737 U | 6/2013 |
| CN | 204087267 U | 1/2015 |
| EP | 2144194 A1 | 1/2010 |

* cited by examiner

Primary Examiner — Jamara A Franklin
(74) Attorney, Agent, or Firm — Hayes Soloway PC (57) ABSTRACT

A system for cataloguing items disposed within a predefined volume;
each item of the items having associated therewith a tag;
each tag having a unique identifier;
each tag including:
a tag radio transmitter having a predefined tag transmission range
a tag radio receiver having a predefined tag reception range
a response logic device;
the system further including a tag interrogator;
the tag interrogator including:
a database
an interrogation logic device
a tag interrogator transmitter having a predefined tag interrogator transmission range
a tag interrogator radio receiver having a predefined tag interrogator reception range;
the tag radio receiver of a first tag receiving communication from the tag radio transmitter of a second tag when the tag radio receiver of the first tag is within the predefined tag transmission range of the second tag and when the second tag is within the predefined tag reception range of the first tag.

21 Claims, 14 Drawing Sheets

INVENTORY MANAGEMENT SYSTEM

TECHNICAL FIELD

The present invention relates to an inventory system allowing the identification of articles in a specific location by peer-to-peer communication of tags associated with respective ones of those articles. In preferred forms one tag is mechanically associated with each article.

In a further form, the present invention relates to a system for cataloguing items and more particularly items disposed within a predefined volume. In a further form, the present invention relates to a hybrid low-power multimodal flocking semi-autonomous tagging system for non-proximal inventory management.

BACKGROUND

A stocktake determines the articles present in a specified location. The most basic form of this being where a person walks through the predefined location and manually records the stock present. For stock already in a specified location this process can be time-consuming especially with large numbers of items. As a result the time between stocktakes may be longer than desired.

Figure 1:
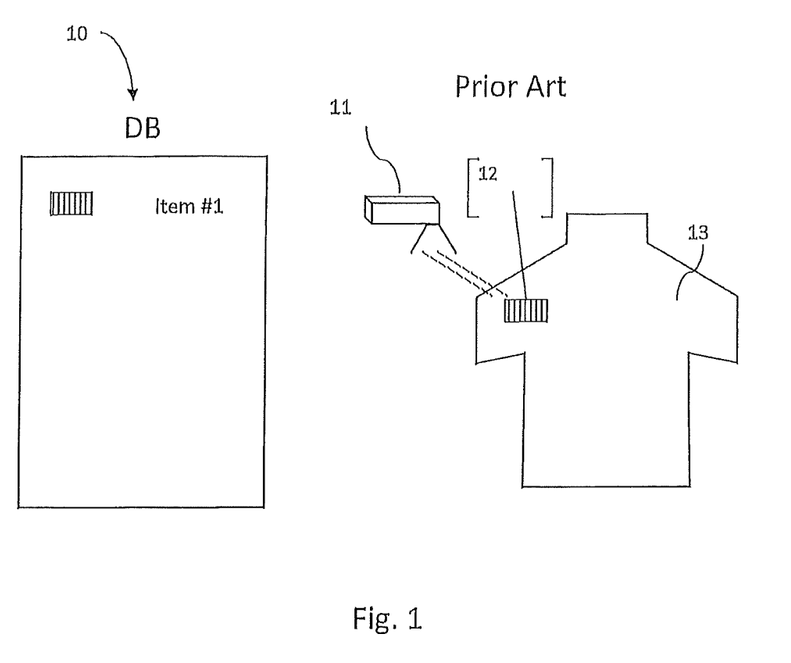
FIG. 1 illustrates a prior art inventory management system based on barcode identification and recognition.

With reference to FIG. 1 the use of a barcode mechanically attached to each article and a portable reader automates the process of recording the stock present (for example, U.S. Pat. No. 7,370,027B2 System for stocktaking asset articles using a mobile device). However this still requires physical transportation of a reader to the articles or of stock to the reader.

Radio Frequency Identification (RFID) devices may be used to increase the distance up to a few meters from the reader to the stock being scanned (CN1776719A—Automatic inventory—making system based on wireless radio frequency) and automatic systems move readers around a warehouse (CN203025737U—Automatic inventory counting equipment and CN204087267U—RFID intelligent stocktaking system suitable for storage rack). However, the distance is still limited and the reader will still need to be physically transported around larger locations.

An alternative system of scanning stock on entry and exit concludes that items marked in but not out are present at the specified location. Such a system may even be automated to allow scanned items on entry to be stored in a specific location within a warehouse (US20080024274—Storage system). This relies on stock entering and leaving via the one point, if this is not the case accurate knowledge of the stock actually present is not assured.

Constant monitoring of stock on shelves, to provide a real-time inventory, may be achieved by sensors hardwired to shelves and the like to determine the presence of absence of stock items (EP2144194A1/US20100010868 System for remove and/or deferred monitoring of the consumption of articles in stock on shelves and the like). The limitation of this system is that the stock and shelves need to be appropriately matched. Placing an article on the wrong shelf would result in incorrect counting of stock. Further, this requires the stock location to be previously wired.

Commercially Available products:
http://web.archive.org/web/20070206082227/http://www.ti.com/rfid/shtml/prod-trans.shtml
http://web.archive.org/web/20070210142917/http://www.ti.com/rfid/default.htm US2007/0046467 "System and method for RFID reader to reader communication". This patent discloses peer to peer communication between RFID networks.

This patent has an emphasis of one-by-one reader interrogation, rather than general "chatter".

All the above systems suffer from problems of inaccuracy and/or locking the stock within a specific volume and in some instances a specific place within the volume. It would be advantageous if a system could be provided which does not require physical transportation of stock or reader and does not require any hardwiring of the stock storage location and can operate with stock distributed over a wide variety of areas and/or volumes.

Notes

The term "comprising" (and grammatical variations thereof) is used in this specification in the inclusive sense of "having" or "including", and not in the exclusive sense of "consisting only of".

The above discussion of the prior art in the Background of the invention, is not an admission that any information discussed therein is citable prior art or part of the common general knowledge of persons skilled in the art in any country.

SUMMARY OF INVENTION

Definitions

Singulation: a method by which an RFID reader identifies a tag with a specific identification number from a number of tags in its field.

Value bag: a token or data packet made up of the ID numbers and any other requested information from the tags to the tag interrogator Tag: A logic capable device mechanically associated with an article of stock.

LAN: A data communications network which is geographically limited and permits the interconnection of computerised equipment.

A preferred way of addressing this issue may include peer-to-peer communication of tags mechanically associated with articles of stock. As a result the volume that can be scanned for a stocktake can be of any size and the limitation of the system becomes the distance between adjacent tags rather. This means the scanner can be fixed in one location.

To allow for peer-to-peer communication it is preferred that the tags have some logic capabilities and sufficient power to send and receive messages. Since the tags are associated with stock that will be transported, it is preferred that the tags have their own portable power supply. Since stock may be transported large distances or be stored for lengthy periods it is preferred if the tag is in a very low or zero power state when not sending or receiving messages. This will minimise the power use and maximise tag life.

In preferred forms, "passive beam-powered" RFID tags, allow the RFID tag to be powered by the signal from a base station. The actions that can be performed by such and RFID tag are limited, however, these RFID tags can be used to wake-up a communications device from a zero power state (compare U.S. Pat. No. 6,525,648 B1: Radio frequency identification systems and methods for waking up data storage devices for wireless communication). However, in this instance once woken by the RFID tag will the communications device draw on its own limited power supply. The passive beam-powered RFID tags can be programmed/manufactured to only wake-up the communication device if the signal from the base station matches it's ID, thus allowing selective wake-up of the communication devices.

Accordingly, in one broad form of the invention there is provided a system for cataloguing items disposed within a predefined volume;
  each item of said items having associated therewith a tag;
  each tag having a unique identifier;
  each tag including:
  a tag radio transmitter having a predefined tag transmission range
  a tag radio receiver having a predefined tag reception range
  a response logic device;
  said system further including a tag interrogator;
  said tag interrogator including:
  a database
  an interrogation logic device
  a tag interrogator transmitter having a predefined tag interrogator transmission range
  a tag interrogator radio receiver having a predefined tag interrogator reception range.

Preferably each tag further includes a power source.

Preferably the power source is internal.

Preferably the power source is in the form of a battery.

Preferably the power source receives an electromagnetic charging signal received on a dedicated power antenna.

Preferably each said tag stores information about the item with which it is associated.

Preferably the information stored on the tag related to the item of stock with which it is associated is updated from a directly connected sensor.

Preferably communication from the tag interrogator is passed tag to tag thereby to increase the range of the tag interrogators communication.

Preferably the tag changes from a very low or zero power state to an higher power state, after receiving communication from the tag interrogator either directly or via another tag.

Preferably in the higher power state the tag transmits a response to the received communication and/or communicates with other tags to pass on the tag interrogator's communication or return other tags responses.

Preferably if a tag responds to the tag interrogator's communication this response can be passed tag to tag, back to the tag interrogator.

Preferably responses may be bundled on return, with tags adding to the back communication.

Preferably the tag interrogator periodically or following a manual start input updates the database of tagged articles of stock present within a predefined volume.

Preferably the logic capability of the tag determines its response to the tag interrogator communication, and if it passes on any received communication from adjacent tags.

Preferably tag interrogator is able to combine responses from tags, and delete any duplicates to create one single stocktake list with which it updates the database.

Preferably the tags return to the very low or zero power state after a predefined time, as determined by the logic capability of the tag.

BRIEF DESCRIPTION OF DRAWINGS

Embodiments of the present invention will now be described with reference to the accompanying drawings wherein.

DETAILED DESCRIPTION OF PREFERRED EMBODIMENTS

FIG. 1 illustrates a prior art barcode identification and recognition system. In this system a passive barcode, 12, is mechanically associated to an article, 13. A reader, 11, is required to identify the article, 13, and must be transported to the article, 13. Once the reader, 11, scans the barcode, 12, on the article then the information contained in the barcode is accessible to the database, 10, and thereby an inventory may be taken.

In embodiments of the present system it is not necessary to transport a reader to the article of interest. Reading of the tags may be carried out utilising wireless communications. In a particular form active logic capable, item associable ID devices, which will be referred to as tags, may be used. These devices incorporate radio communication capability such that a tag interrogator (which in some forms may be stationary—in others portable or mobile) may communicate with the tags via radio communication thereby to transmit data from one or more of the tags to a database. In preferred forms, it is not critical where articles are placed within a predefined volume, for example warehouse, to be included in any stocktake. In preferred forms it is not necessary that the predefined volume have hardware, such as wires or sensors on shelves. Embodiments of the present invention may thereby allow up-to-the-minute stock-taking and stock-location capabilities to a high level of certainty.

Figure 2:
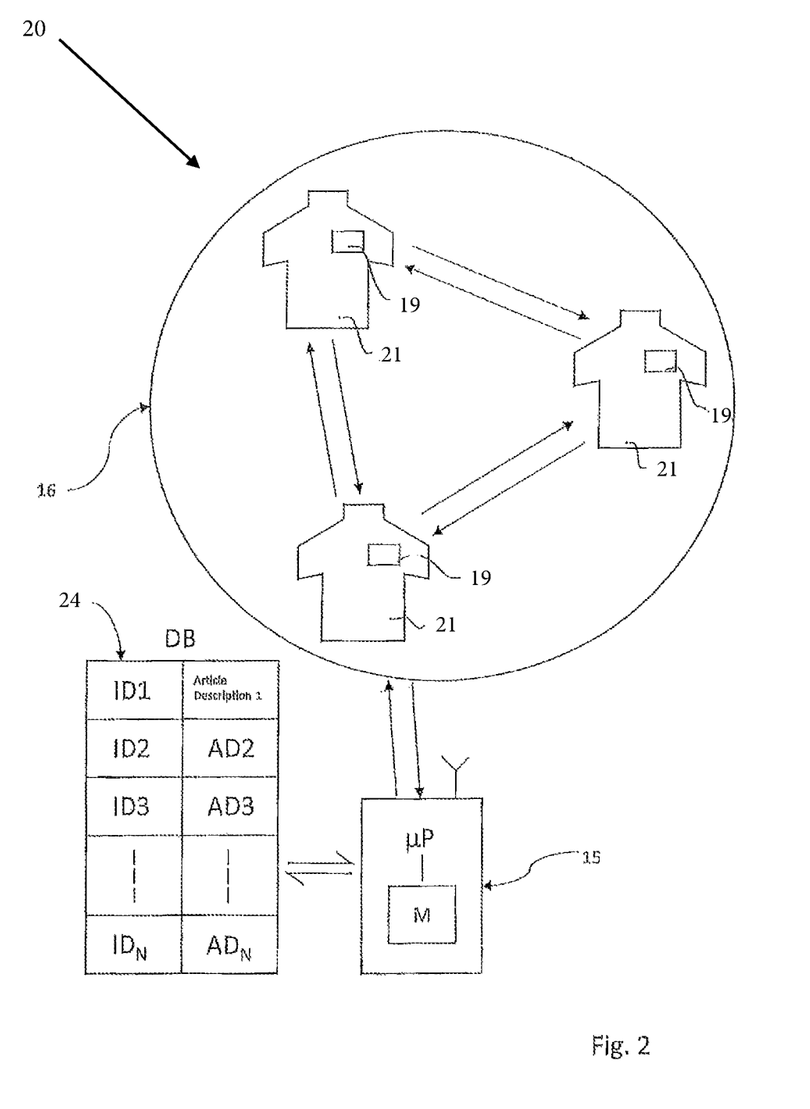
FIG. 2 is an illustration of the basic components an inventory management system in accordance with a preferred embodiment.

FIG. 2 illustrates the basic components of a first preferred embodiment of the present system, 20. In this instance a database, 24, stores information regarding the tags, 19 and the articles, 21 to which they are mechanically associated. In a preferred form one tag, 19 is associated with each article, 21. A tag interrogator, 15, is connected to the database, 14, and is able to send an enquiry/inventory call to the tags, 19 as well as receive the response of the tags, 19 and translate this information in such a way as to update the database, 14. The tags, 19 are preferably mechanically associated with articles placed within a predetermined communication range of at least one other tag, 19. In preferred forms a wake-up call, 16 sent by the tag interrogator, 15 will wake-up that tag, 19 and all other tags within a predetermined communication range of the interrogator 15. In preferred forms tags, 19 are capable of tag-to-tag communication that may be used to propagate the tag interrogator enquiry/inventory call to other tags 19 which may not be within the predetermined communication range of the interrogator 15. In one form the result of the tag interrogator enquiry, is that information regarding the tags present is collated and returned to the tag interrogator 15. In one preferred form there may be no limit on the volume in which the stock and associated tags may be placed, provided that every tag is within communication range of at least one other tag that will wake-up with the same wake-on ID call.

The information contained on each tag is imprinted by a central stock management computer when they are mechanically attributed to their associated articles. Each tag may have a hardware level unique identification code. The information contained on a tag may include, but is not limited to product type, colour, size, and manufacture date. A tag may also be directly linked to a sensor on the product which could give regular updates on the product status, For example, the remaining fluid in a drum. The information stored on the tag19 may be updated by the sensor readings. Information may be written onto a tag, or the tag branded, individually or the same information may be written onto a group of tags mechanically associated to identical articles of stock.

A tagging bin system made of faraday cage materials permits information to be written to a whole group of tags at once. The Faraday cage ensures that no electromagnetic radiation from an external source interferes with the branding of the tags. After sale of a stock item, the tag may be removed and attached to a new article of stock and then re-branded. In preferred forms tags are reusable.

The tags have the communication and cybernetic capabilities sufficient to self-brand, self-identify and self-inventories. An extension of the EPC 96 bit code allows for a categorisation to permit class self-identity.

In a preferred embodiment each tag has three antenna, one to receive a low-power signal to wake it up, one to receive higher-power message containing signals, and one to receive a signal that charges the tag. It is also possible to replace the antenna for charging with a battery. It is further possible to run the system with one higher-power communication antenna, although this is a more limited system using more power as the tags cannot enter a very low or zero-power state.

In the preferred embodiment the Tags will be in a zero-power state until wake-up. The wake-up signal will provide the power required to wake-up the tag, which will then draw on its own power source. In a preferred form the wake-up process may be selective, but the system may also wake-up all tags and still function as an inventory management system.

Figure 3:
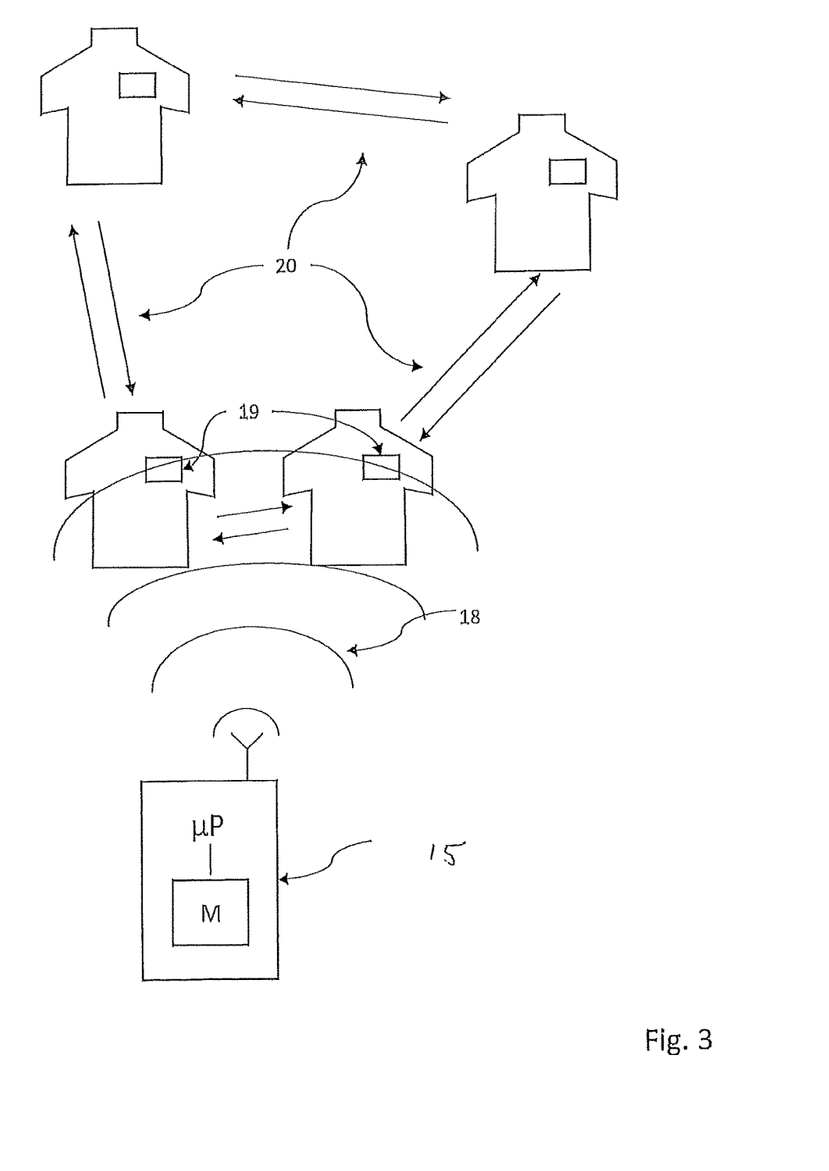
FIG. 3 is an illustration of the enquiry/inventory call stage of the preferred embodiment.

FIG. 3 illustrates the process involved in an enquiry/inventory call. The tag interrogator, 15, sends out a secured lower-power wake-on signal, for example using LAN, 18, which is received by those tags in the transmission range of the tag interrogator, 15. Those tags that receive the enquiry/inventory call then propagate the call to other tags in their inter tag transmission range, 22. The enquiry/inventory call continues via tag-to-tag communication so that all tags in a predefined volume receive the enquiry/inventory call. All tags will pass on an enquiry/inventory call, and response, thereby allowing the enquiry/inventory call to ripple through all tags. There is no limit to the number of tags that may be included in this process, it is only required that all tags are within lower-powered signal range of another tag that wakes up.

In the preferred embodiment, the enquiry/inventory call may be selective, but the system may also call all article types. The enquiry/inventory call will be for all articles or only specific article types defined by a unique ID, or range or groups of IDs. One example of a specific article type is the articles owned by a specific person/organisation. The IDs sought are identified by a specific frequency of the initial enquiry/inventory call.

In the preferred embodiment, It is only those tags matching the requested ID(s) that will wake-up, and be capable of receiving a further message-signal on a higher-power secure communication system as well as being able to self-identify using the same higher-power secure communication system.

In the preferred embodiment, After the tag-interrogator has sent the lower-power wake-on-LAN, it then sends a message on a higher-power secure communication. This message consists of a wave/message ID to identify the message and then the message request itself. In its simplest form the message request could be a count request or stocktake. The propagation of this signal is similar to the wake-on signal illustrated in FIG. 2, however, it will jump over any tag that has not woken.

Figure 4:
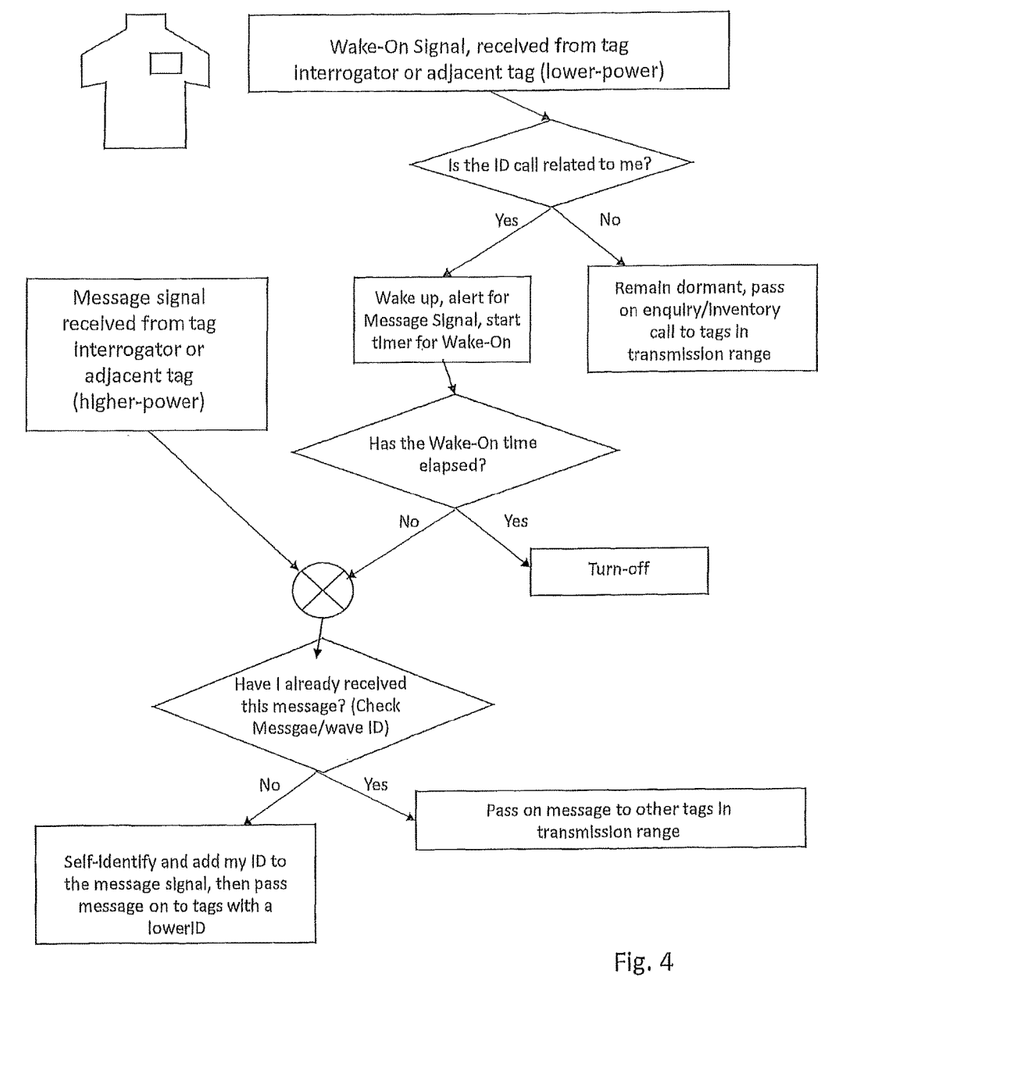
FIG. 4 is a flow chart of the decision logic of each tag when it receives a signal from another tag or the tag interrogator.

In the preferred embodiment, When a tag receives the message it passes this on to any other tags in transmission range. In addition, if the tag has not received the message previously it self-identifies, adding its ID to the message and/or answering the message request. The logic, or "latching protocol" of determining if the message has been previously received ensures that the tag only self-identifies once for a given message. If a tag self-identifies it then transmits the updated message to other tags using a specific id Message identification and control protocol. By transmitting to tags with a using this protocol then the message progresses preferentially back to the tag interrogator. The pre-defined logic followed by the tag is illustrated in the flow chart of FIG. 4.

Figure 6:
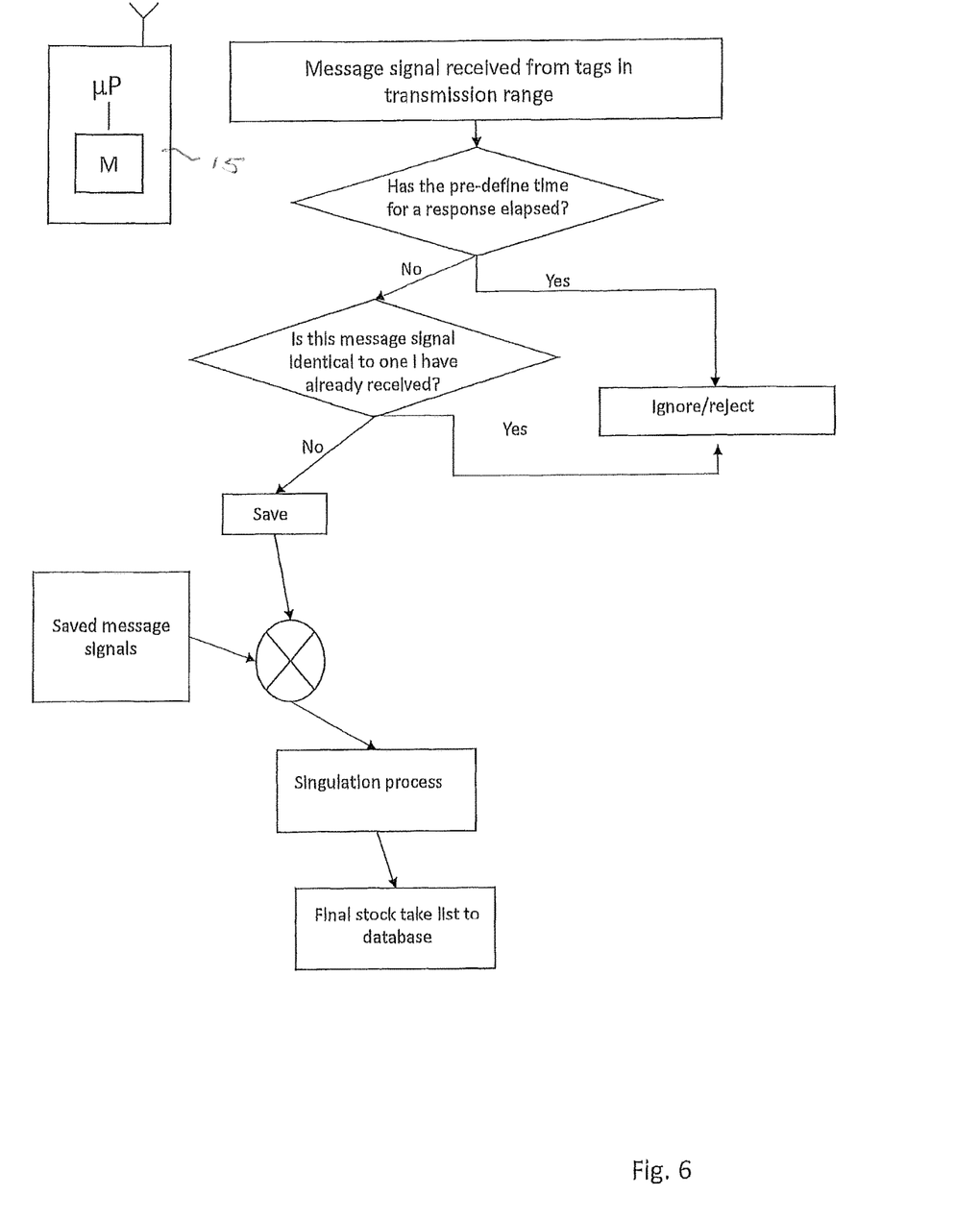
FIG. 6 is a flow chart of the tag interrogator as it complies the responses received from the tags.

Tags within the transmission range of the tag-interrogator will send the message signal, with all the added IDs and answers to the request to the tag interrogator. The tag interrogator will receive multiple message signals from the tags in transmission range. It then singulates the message signals to obtain a single list of tag IDs, deleting duplicates, that are within the IDs requested and thereby completing a stocktake of the article types of interest. The tag interrogator then updates the database of stock. FIG. 6 is a flow chart of the logic used by the tag interrogator.

After a predefined time has elapsed since the original Wake-On signal from the tag-interrogator the tag-interrogator ignores/rejects any further messages sent by tags in the transmission range and the tags return to their hibernation (semi-passive) state, thus transmissions progressively cease. The predefined time should be selected so that all tags of interest should have received the message, responded, and that the responses returned to the tag interrogator. The allowed response time will need to be greater for larger volumes.

Throughout the whole process, the tag has performed one of four tasks: transmission self-identity with wave/message-ID latching to tags using the Message identification and control protocol, transmission of call to peers, reception of the calls from other tags, and the transmission of a singulated bundle. The tag interrogator has initiated the process with a enquiry/inventory call, received the responses and then singulated the returning responses into a single stock list.

Figure 5:
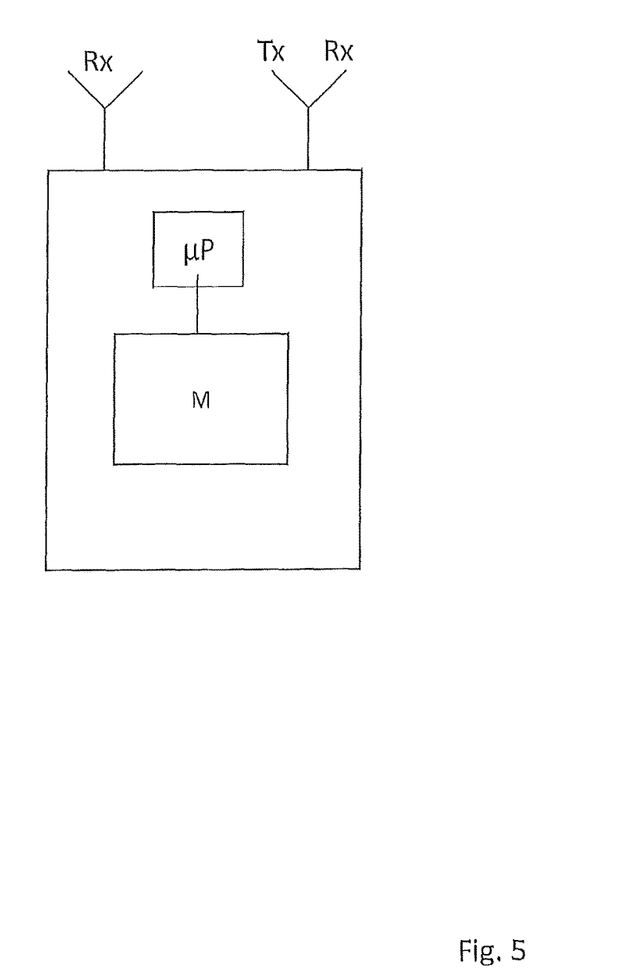
FIG. 5 is a block diagram of a tag structure in accordance with a preferred embodiment.

FIG. 5 is a block diagram of a tag structure in accordance with a preferred embodiment.

FIG. 6 is a flow chart of the tag interrogator as it compiles the responses received from the tags.

Figure 7:
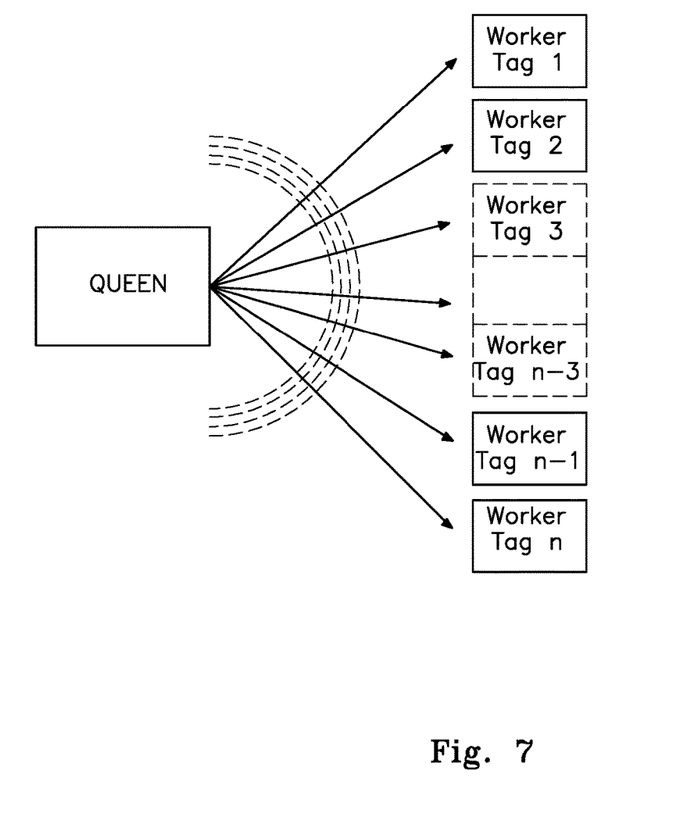
FIG. 7 illustrates diagrammatically an initial broadcast message.

In use:

With reference to FIG. 7, an initiation broadcast message is sent to an electronic switch constructed in a manner similar to semi-passive RFID. This is frequency tuned to the owner of the stock. [Optional By being semi-passive no power is needed.]

Figure 8:
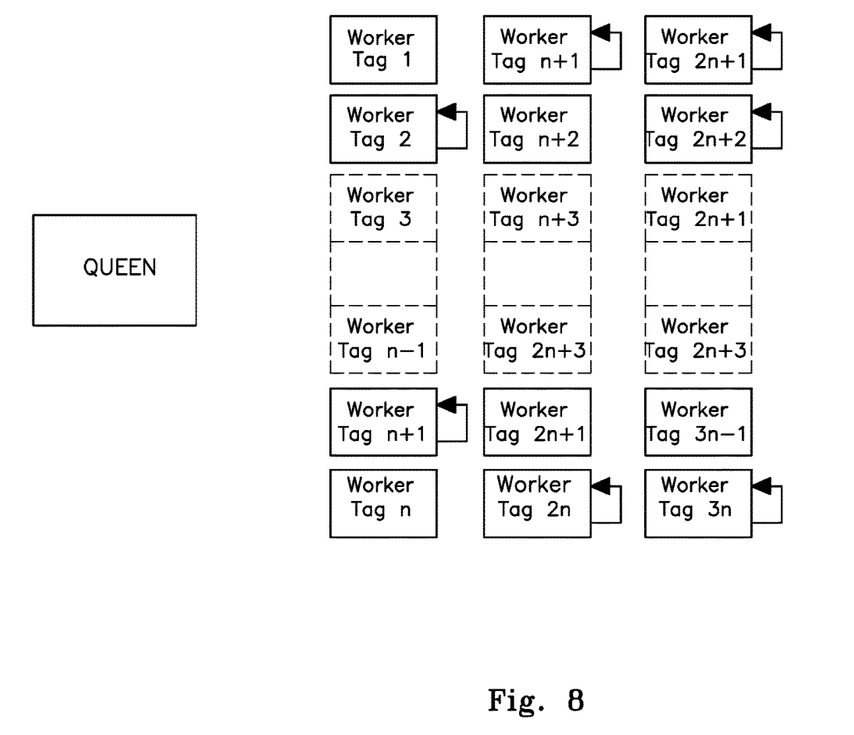
FIG. 8 illustrates diagrammatically selective reception of the broadcast message of FIG. 7.

With reference to FIG. 8, those tags that are frequency keyed empower a second circuit in the smart tag, which is switched on for a short period of time to receive a second wave message. The second low power broadcast mechanism is based on wifi or similar style signal and is capable of full receive and transmit. This uses the adaptive binary tree mechanism of RFID singulation.

Figure 9:
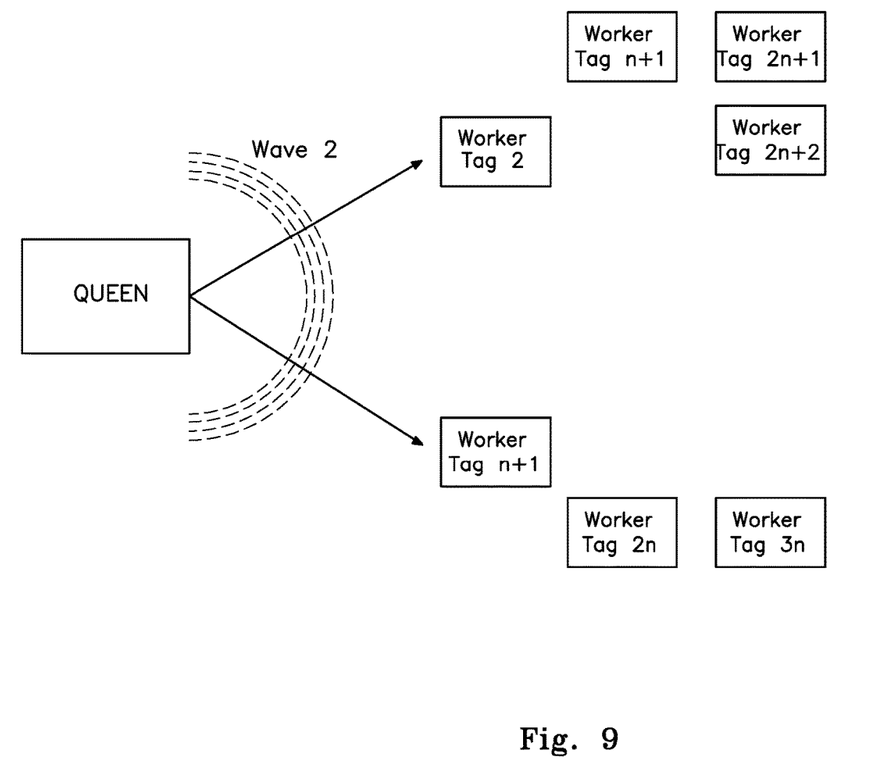
FIG. 9 illustrates diagrammatically a second broadcast message.

With reference to FIG. 9 wave 2 messages initiate swarm behaviour. They consist of a Wave ID and a message request, which is also an identifier. The categorical self-count (stocktake) message request is used as an example here. This involves adding a dictionary token with a unary value or incrementing and existing dictionary token to a value bag.

Figure 10:
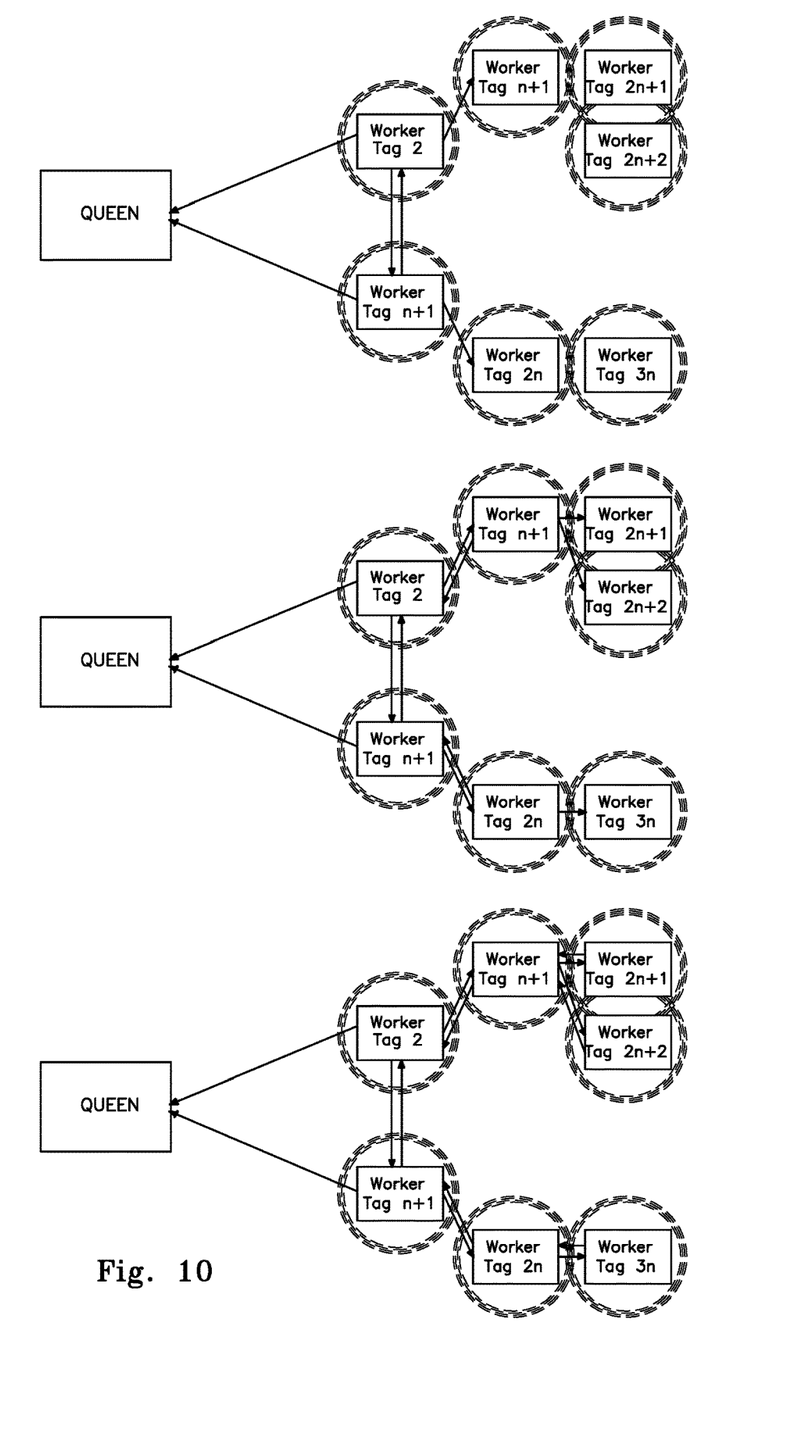
FIG. 10 illustrates pass along operation of the tags.
Figure 11:
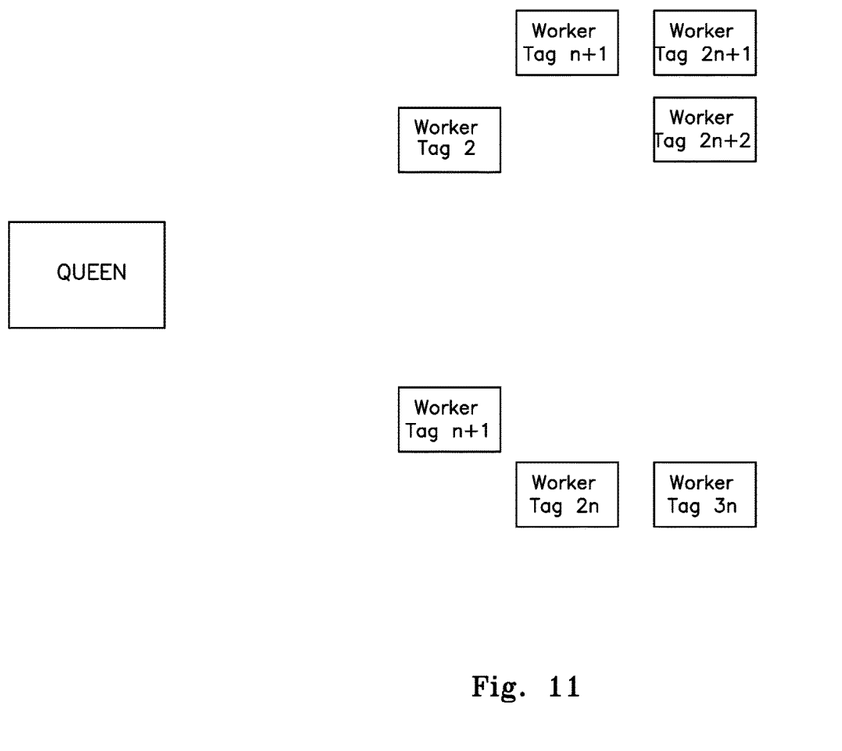
FIG. 11 illustrates cessation of transmissions on closing of a time window.

With reference to FIG. 10, the tag will always pass on the value bag to the neighbouring tags if it receives it within a temporal window. After the token has been placed in the value bag or incremented, the wave ID and action time is written to an internal buffer. All subsequent requests are treated as pass-along only operation, where the waveID and messageID along with the value bag are passed to the neighbouring tags with no change. The nature of the pass-along operation is that it will also seek out the Queen computer. The tags closest to the queen computer. Therefore start to send multiple value-bags to the queen computer, which then reduces them to a unique set of values With reference to FIG. 11, the final stage is the cessation of the transmissions of the value-bags on the closing of the time window. If two dissimilar value-bags are received by the Queen computer even in the last moment of the time window, the Queen will still perform a reduction of the values to a unique set. All the transmissions having stopped, the tags that have just been active return to their semi-passive state.

Block Chain Structures

Blockchain structures may be used to advantage with any of the above described embodiments.

Figure 12:
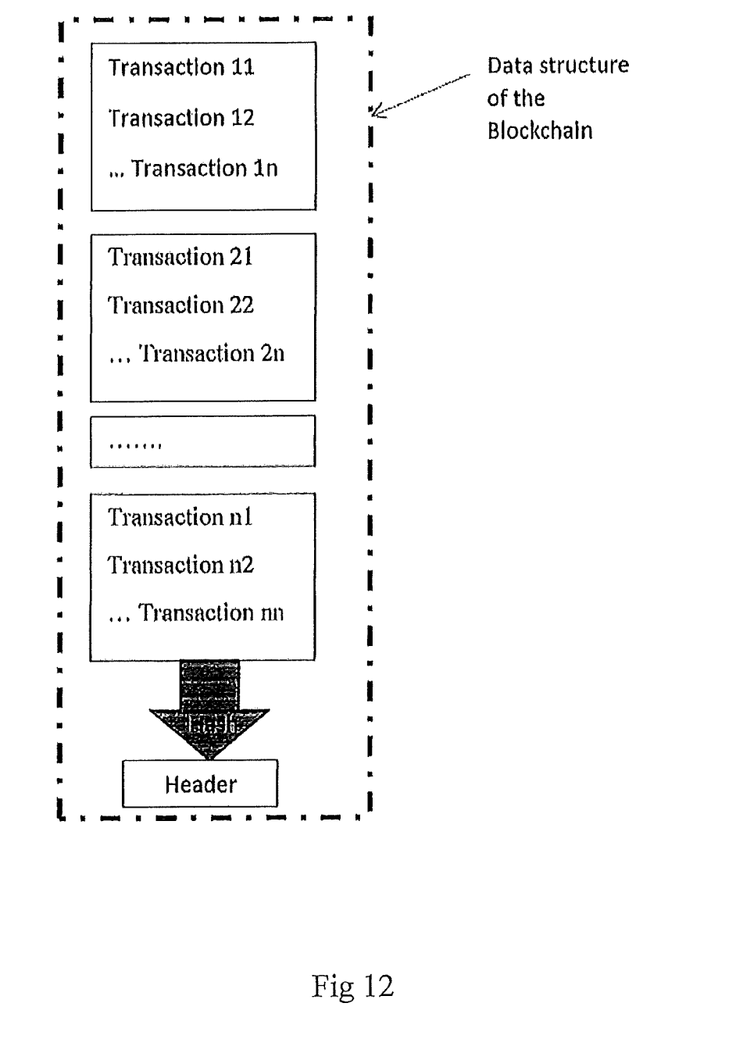
FIG. 12 is a diagram of an exemplary block chain data structure.

FIG. 12 is a diagram of an exemplary block chain data structure.

Figure 13:
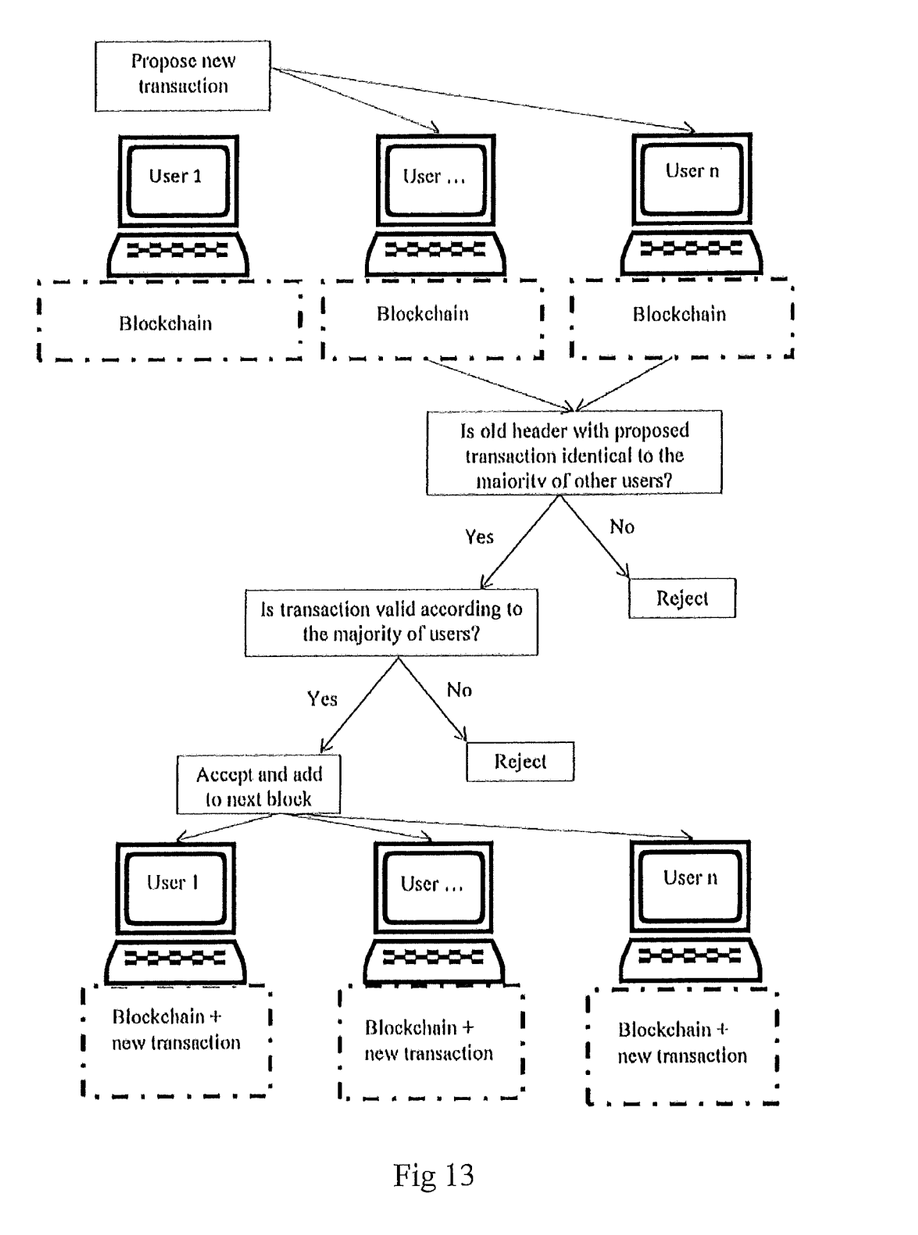
FIG. 13 illustrates diagrammatically use of the block chain data structure of FIG. 12.

FIG. 13 illustrates diagrammatically use of the block chain data structure of FIG. 12.

With reference to FIGS. 12 and 13, Blockchain is a data structure and distributed record system, which seeks to provide a data structure and system which maintains a complete record of all transactions and minimizes risk of retrospective alterations, or double or identical transactions.

The data structure consists of a series of transactions grouped in blocks, which need to be verified before they are added to the chain. Rules may be set so no data is ever deleted, with the longest chain being taken to be the most recent, and so the chain records all transactions from its initiation in chronological order.

A copy of the chain is kept by all users, and so is a distributed record system. Before any transactions are added the majority of the users need to agree that the transaction is acceptable and then it is bundled with other acceptable transactions into a block, which is added to the chain. Each block has a header which can only be created knowing all the previous transactions. As a result, if a retrospective alteration is made the header will be incorrect and any new block proposed by that user will be rejected. The security of the system is further enhanced by having mathematical problems that can only be solved by trial and error, which use the header and must be solved and then verified by the majority of other users before a block is accepted into the chain by all users. As long as there are more genuine users than coordinated attackers trying to alter the chain then the chain will be secure. There may be other methods used to determine the veracity of a block of data, this may include voting or consent processes where parties with a stake in the transaction or related transactions or in the chain itself are granted 'voting' rights. Another process may involve a random or systematized voting or approval system where the validity of the block of data is approved in accordance with a set of protocols agreed by those with a stake in the veracity of the chain of data.

In a more particular form, each block includes verified transactions and the blockchain maintains a ledger all prior transactions. The blockchain is duplicated by all the computers on a network.

The first block in the chain is known as the Genesis block and new blocks can be added in linear and chronological order. From any given block in the chain the information of this genesis block and all blocks that led back to this one can be retrieved. A blockchain is essentially numerous blocks connected through hash chaining where each block is comprised of the following Timestamp: provides proof that the data in a block existed at a particular time Previous Hash: Essentially a pointer to the previous block.

Merkle Hash: Summary of all executed transactions

Nonce: Individual blocks identity and is an arbitrary number which can only be used once The blockchain is managed by a network of distributed nodes where each node contains a copy of the entire blockchain. Each node in the network can add blocks to the chain, where every node is adding blocks at the same point in the chain at the same time. The more nodes that comprise the network the harder it is to disrupt the storage of the blockchain. Unlike centralised systems which rely on a single authority, there is no single point of failure in these distributed nodes network. If you change the content of a block you change its Hash.

Figure 14:
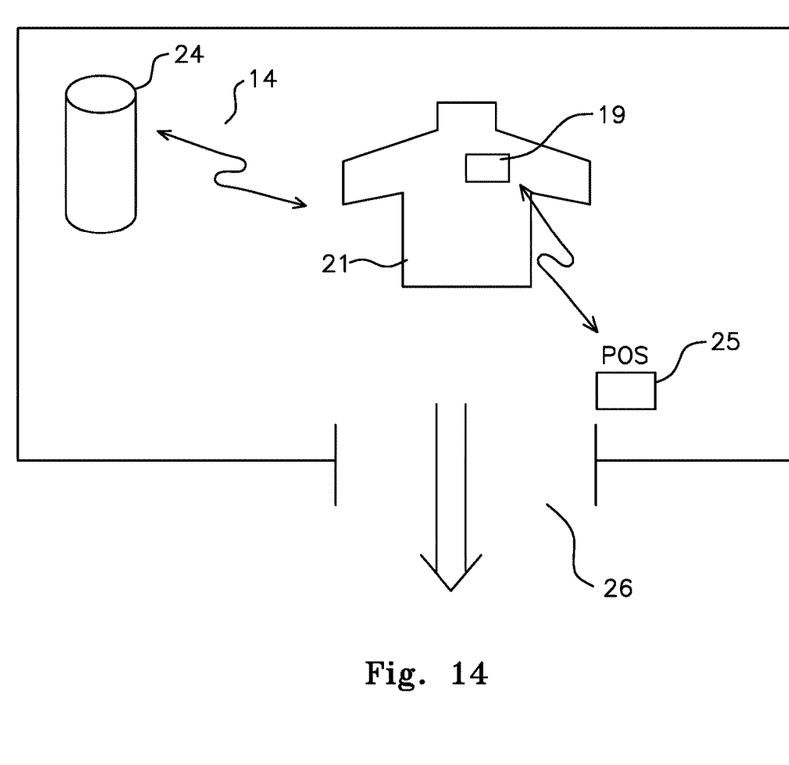
FIG. 14 illustrates application of the tag system to a Point of Sale system.

FIG. 14 illustrates application of the tag system to a Point of Sale system.

In this arrangement the system for cataloguing 14 via database 24 tracks articles such as article 21 such that when the article passes Point Of Sale terminal 25 in the direction of exit 26 the system 14 communicates with the Point Of Sale terminal 25 whereby a transaction involving sale of article 21 identified by tag 19 is transacted. The successful conclusion of the transaction allows inventory stored in the database 24 to be updated.

The invention claimed is:

1. A system for cataloguing items disposed within a predefined volume;
   each item of said items having associated therewith a tag;
   each tag having a unique identifier;
   each tag including:
   a tag radio transmitter having a predefined tag transmission range;

a tag radio receiver having a predefined tag reception range;
a response logic device;
said system further including a tag interrogator;
said tag interrogator including:
a database;
an interrogation logic device;
a tag interrogator transmitter having a predefined tag interrogator transmission range;
a tag interrogator radio receiver having a predefined tag interrogator reception range;
the tag radio receiver of a first tag receiving communication from the tag radio transmitter of a second tag when the tag radio receiver of the first tag is within the predefined tag transmission range of the second tag and when the second tag is within the predefined tag reception range of the first tag;
wherein communication from the tag interrogator is passed from the second tag to the first tag thereby to increase the range of the communication of the tag interrogator.

2. The system of claim 1 wherein each tag further includes a power source.

3. The system of claim 2 where the power source is internal.

4. The system of claim 3 wherein the power source is in the form of a battery.

5. The system of claim 3 wherein the power source receives an electromagnetic charging signal received on a dedicated power antenna.

6. The system of claim 1 where each said tag stores information about the item with which it is associated.

7. The system of claim 6 where the information stored on the tag related to the item of stock with which it is associated is updated from a directly connected sensor.

8. The system of claim 1 wherein communication from the tag interrogator is passed tag to tag thereby to increase the range of the tag interrogators communication.

9. The system of claim 8 wherein in the higher power state the tag transmits a response to the received communication and/or communicates with other tags to pass on the tag interrogator's communication or return other tags responses.

10. The system of claim 9 wherein responses may be bundled on return, with tags adding to the back communication.

11. The system of claim 1 wherein the tag changes from a very low or zero power state to a higher power state, after receiving communication from the tag interrogator either directly or via another tag.

12. The system of claim 1 wherein if a tag responds to the tag interrogator's communication this response can be passed tag to tag, back to the tag interrogator.

13. The system of claim 1 where the tag interrogator periodically or following a manual start input updates the database of tagged articles of stock present within a predefined volume.

14. The system of claim 1 where the logic capability of the tag determines its response to the tag interrogator communication, and if it passes on any received communication from adjacent tags.

15. The system of claim 1 wherein the tag interrogator is able to combine responses from tags, and delete any duplicates to create one single stocktake list with which it updates the database.

16. The system of claim 1 wherein the tags return to the very low or zero power state after a predefined time, as determined by the logic capability of the tag.

17. The system of claim 1 wherein said database is implemented as a blockchain structure.

18. The system of claim 1 where each tag comprises a passive beam-powered RFID tag which can be programmed/manufactured to only wake-up a communication device associated with it if the signal from a base station matches it's ID, thus allowing selective wake-up of the communication devices.

19. A system for cataloguing items disposed within a predefined volume;
each item of said items having associated therewith a tag;
each tag having a unique identifier;
each tag including:
a tag radio transmitter having a predefined tag transmission range;
a tag radio receiver having a predefined tag reception range;
a response logic device;
said system further including a tag interrogator;
said tag interrogator including:
a database;
an interrogation logic device;
a tag interrogator transmitter having a predefined tag interrogator transmission range;
a tag interrogator radio receiver having a predefined tag interrogator reception range;
each said tag incorporating a low power state from which the tag can be awoken when a signal is sent to the tag;
the tag radio receiver of a first tag receiving communication from the tag radio transmitter of a second tag when the tag radio receiver of the first tag is within the predefined tag transmission range of the second tag and when the second tag is within the predefined tag reception range of the first tag;
wherein communication from the tag interrogator is passed from the second tag to the first tag thereby to increase the range of the communication of the tag interrogator.

20. The system of claim 19 wherein each tag comprises a passive beam-powered RFID tag which can be programmed/manufactured to only wake-up the communication device if the signal from a base station matches the ID of the tag, thus allowing selective wake-up of the communication devices.

21. The system of claim 20 wherein the RFID tag wakes-up a communications device associated with the tag from a zero power state.

* * * * *